(12) United States Patent
Hu

(10) Patent No.: US 7,917,441 B2
(45) Date of Patent: Mar. 29, 2011

(54) METADATA DRIVEN METHODS AND SYSTEMS TO PROCESS FINANCIAL DATA

(75) Inventor: Qilin Hu, San Jose, CA (US)

(73) Assignee: eBay Inc., San Jose, CA (US)

( * ) Notice: Subject to any disclaimer, the term of this patent is extended or adjusted under 35 U.S.C. 154(b) by 1204 days.

(21) Appl. No.: 11/506,983

(22) Filed: Aug. 18, 2006

(65) Prior Publication Data
US 2007/0043683 A1     Feb. 22, 2007

Related U.S. Application Data

(60) Provisional application No. 60/709,880, filed on Aug. 19, 2005.

(51) Int. Cl.
*G06F 21/00* (2006.01)
(52) U.S. Cl. ............................... 705/53; 705/80
(58) Field of Classification Search ............ 705/53, 705/80
See application file for complete search history.

(56) References Cited

U.S. PATENT DOCUMENTS

| | | | | |
|---|---|---|---|---|
| 2002/0194124 A1* | 12/2002 | Hobbs et al. | .................. | 705/39 |
| 2004/0143527 A1* | 7/2004 | Benkert et al. | .................. | 705/35 |
| 2005/0131885 A1* | 6/2005 | Komatsu et al. | .................. | 707/3 |
| 2009/0030793 A1* | 1/2009 | Fordyce, III | .................. | 705/14 |
| 2009/0157518 A1* | 6/2009 | Bishop et al. | .................. | 705/19 |
| 2010/0161404 A1* | 6/2010 | Taylor et al. | .................. | 705/14.38 |

* cited by examiner

*Primary Examiner* — Pierre E Elisca
(74) *Attorney, Agent, or Firm* — Schwegman, Lundberg & Woessner, P.A.

(57) ABSTRACT

Metadata driven methods and systems utilized to process financial data include a method to generate a plurality of first acquirer dependent software components based on a first acquirer settlement metadata file that corresponds to a first acquirer. The first acquirer dependent software components are used to generate an acquirer settlement file based on financial data. The acquirer settlement file is communicated to the first acquirer that is included in an automatic clearing house system that processes the financial data. In addition, the metadata driven methods and systems utilized to process financial data include a method to generate a plurality of first acquirer dependent software components based on a first acquirer return metadata file that corresponds to a first acquirer. The first acquirer dependent software components are used to process an acquirer return file that is received from the first acquirer and includes financial data. The first acquirer is included in an automatic clearing house system.

30 Claims, 13 Drawing Sheets

METADATA DRIVEN METHODS AND SYSTEMS TO PROCESS FINANCIAL DATA

RELATED APPLICATIONS

This application claims the priority benefits of U.S. Provisional Application No. 60/709,880 filed Aug. 19, 2005, which is incorporated herein by reference.

TECHNICAL FIELD

The present application relates generally to the technical field of information processing and, in one specific example, to metadata driven methods and systems to process financial data.

BACKGROUND

Originator systems (e.g., merchants, payment systems, etc.) use financial clearing house systems to process financial transactions. The originator system must select one acquirer system (e.g., vendor) from many acquirer systems (e.g., Netgiro, Wells Fargo, Hong Kong and Shanghai Banking Corporation (HSBC)) to access the financial clearing house system because each acquirer system typically specializes in a particular type of transaction (e.g., International, domestic, credit, etc.). For example, the originator system may aggregate international transactions into a batch and submit the batch to an acquirer system that specializes in processing international transactions. In response, the selected acquirer system processes the international transactions by using the services of other systems in the financial clearing house system and communicates a return file back to the originator. The return file may include a status (e.g., success, fail, etc.) for each of the financial transactions included in the settlement file. Originator systems must be sufficiently flexible to interact with the different acquirer systems because each acquirer system requires that the settlement file and return file be conformed to semantics (e.g., the meaning of the data) and formatting that are unique to the acquirer system. Consequently, originator systems must develop and maintain multiple versions of software. For example, each version of software may be used to generate a settlement file that may be processed by a specific acquirer and to process a return file that may be received from the specific acquirer.

BRIEF DESCRIPTION OF THE DRAWINGS

Various example embodiments are illustrated by way of example and not limitation in the figures of the accompanying drawings, in which like references indicate similar elements and in which.

DETAILED DESCRIPTION

Metadata driven methods and systems to process financial data are described. In the following description, for purposes of explanation, numerous specific details are set forth in order to provide a thorough understanding of the present invention. It will be evident, however, to one skilled in the art that the present invention may be practiced without these specific details.

Figure 1:
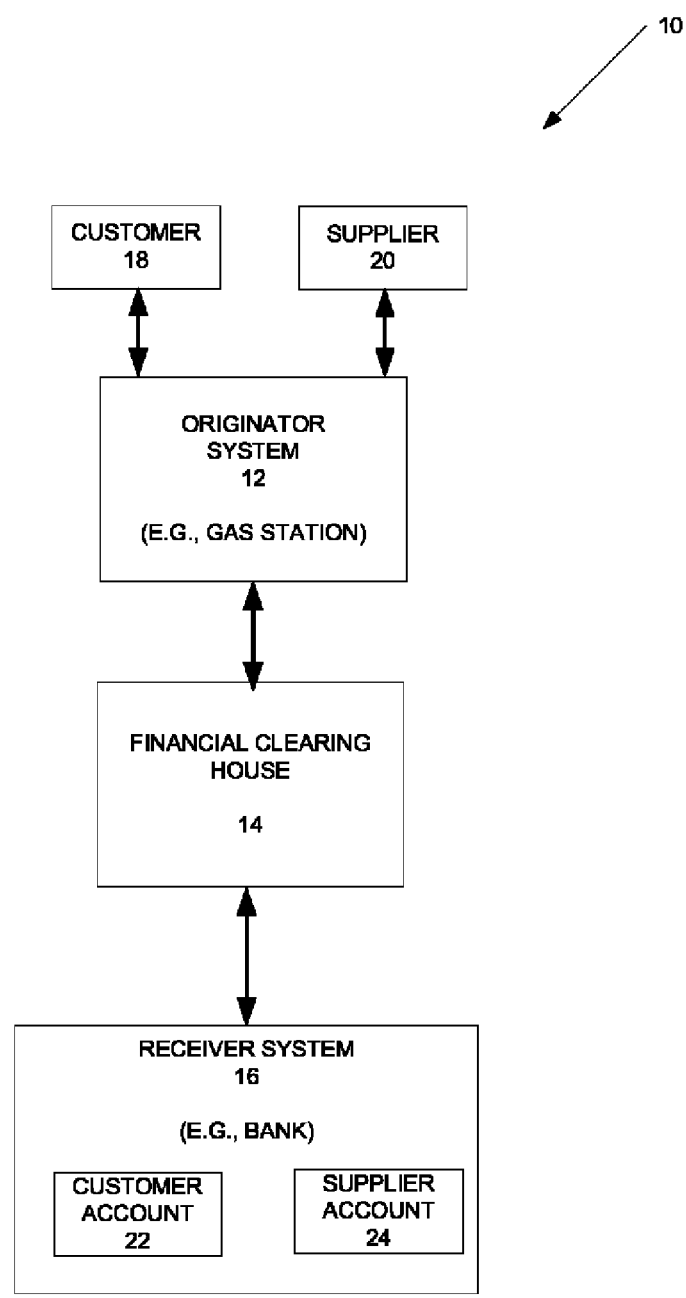
FIG. 1 is a block diagram illustrating a financial clearing house concept used in an example embodiment of the present disclosure.

FIG. 1 is a block diagram illustrating a financial clearing house concept used in an example embodiment of the present disclosure. The financial clearing house concept includes an originator system 12, a financial clearing house 14, and a receiver system 16. The originator system 12 may provide services and/or products to a customer 18 and may receive services and/or products from a supplier 20. For example the originator system 12 may include a gas station that sells gasoline to the customer 18 and buys gasoline from the supplier 20 (e.g., gasoline distributor). The receiver system 16 may, similarly, provide services to the customer 18 and the supplier 20. For example, the receiver system 16 may be a bank that provides financial services to the customer 18 and financial services to the supplier 20. The receiver system 16 is shown to include a customer account 22 that may be controlled by the customer 18 (e.g., credit/debit) and a supplier account 24 that may be controlled by the supplier 20 (e.g., credit/debit).

Generally, the financial clearing house concept 10 is to simplify the exchange of money between the originator system 12 and the receiver system 16. Specifically, the financial clearing house concept 10 enables the originator system 12 and the receiver system 16 to reconcile a number of transactions between the originator system 12 and the receiver system 16 with a single transfer of money. Typically, the transactions may be accumulated for a fixed period of time (e.g., one day) and processed as a batch. For example, on a given day, the originator (e.g., gas station) may sell $25 gasoline to the customer 18 and purchase $5,000.00 of gasoline from the supplier 20 (e.g., gasoline distributor). To complete the above mentioned transactions, the customer 18 may authorize the originator system 12 to debit $25 from the customer account 22 at the receiver system 16 (e.g., bank) and the supplier 20 may authorize the originator system 12 to credit $5,000.00 to the supplier account 24 at the receiver system 16 (e.g., bank). Accordingly, the originator system 12 (e.g., gas station) and the receiver system 16 (e.g., bank) may use the financial clearing house 14 to reconcile the transactions between the originator system 12 (e.g., gas station) and the receiver system 16 (e.g., bank). For example, the financial clearing house 14 may transfer $2,975.00 from the originator system 12 (e.g., gas station) to the receiver system 16 (e.g., bank) while the originator system 12 (e.g., gas station) and the receiver system 16 (e.g., bank) reconcile their respective local obligations to the customer 18 and the supplier 20.

Figure 2:
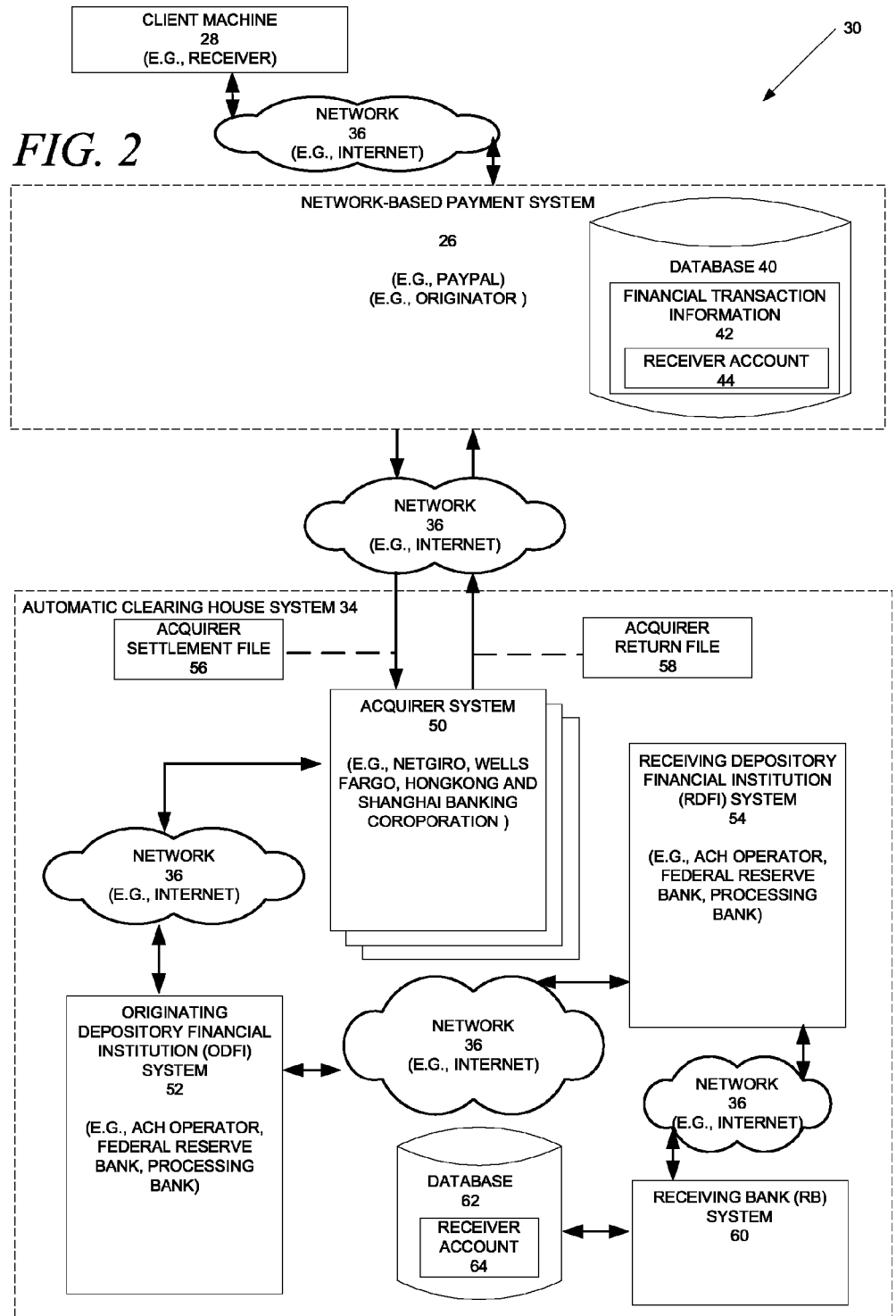
FIG. 2 is a block diagram illustrating a system used in an example embodiment of the present disclosure to process financial transaction information.

FIG. 2 is a block diagram illustrating a system 30, used in an example embodiment of the present disclosure, to process financial transaction information. The system 30 is shown to include a network-based payment system 26 (e.g., originator 12) and an automatic clearing house system 34.

The network-based payment system 26 is shown to communicate over a network 36 with a client machine 38 that may be operated by a user that may make payments to other users on the network-based payment system 26. The network-based payment system 26 is further shown to communicate over the network 36 with the automatic clearing house system 34 and to include a database 40. The database 40 may store financial transaction information 42 that may include a receiver account 44 that may be controlled (e.g., debited/credited) by the user. For example, the user may authorize the network-based payment system 26 to transfer money into or out of the receiver account 44.

The network 36 may include the Internet or any other networking technology that is capable of communicating electronic data.

The automatic clearing house (ACH) system 34 is shown to communicate over the network 36 with the network-based payment system 26 and may process financial transactions, as previously described. In one embodiment the ACH system 34 may operate under the guidance of the National Automated Clearing House Association (NACHA) or The Electronic Payments Association. NACHA represents more than 12,000 financial institutions through memberships and a network of regional payments associations, and 650 organizations through its industry councils. In one embodiment, the NACHA may develop operating rules and business practices for the ACH System 34. The ACH system 34 may include an acquirer system 50, an originating depository financial institution (ODFI) system 52, a receiving depository financial institution (RDFI) system 54, and a receiving bank system 60.

The acquirer system 50 may receive an acquirer settlement file 56 from the network-based payment system 26 that may include a batch of transactions to be settled through the ACH system 34. In addition, the acquirer system 50 may return or communicate an acquirer return file 58 over the network 36 to the originator system 12 that may include the status of the requested processed transactions. For example, some transactions may be completed successfully and others may fail (e.g., insufficient funds). The system 30 further shows multiple acquirer systems 50 (e.g., vendors) that may provide common and specialized acquirer services. For example, the vendors may include Netgiro, Wells Fargo, HSBC, and others. Each vendor may require that the acquirer settlement file 56 and the acquirer return file 56 be specifically formatted according to predefined semantics and syntax. The acquirer system 50 may further communicate, over the network 36, with the ODFI system 52 (e.g., ACH operator, Federal Reserve Bank, processing bank) to process transactions.

The ODFI system 52 may communicate, over the network 36, with the RDFI system 54 (e.g., ACH operator, Federal Reserve Bank, processing bank). The RDFI system, in turn, may communicate, over the network 36, with the receiving bank system 60. The receiving bank system 60 is shown to be coupled to a database 62 that may store a receiver account 64 that may be controlled by the user.

Broadly speaking, the user may operate the client machine 28 to authorize the network-based payment system 26 to withdraw money from the receiver account 64 and to deposit the money into the receiver account 44. In response to the authorization, the network-based payment system 26 may generate a financial entry that authorizes the withdrawal and store the financial entry in a batch of transactions in an acquirer settlement file 56 that may be communicated to the acquirer system 50. The acquirer system 50, in turn, may communicate the financial entry to the appropriate ODFI system 52 that, in turn, may communicate the financial entry to the appropriate RDFI system 54 that, in turn, may communicate the financial entry to appropriate receiving bank system 60 that, in turn, may withdraw the money from the receiver account 64. For example, if the receiving bank system 60 determines that adequate funds are in the receiver account 64 then the receiving bank system 60 may withdraw the funds and return a success status. Otherwise the receiving bank system 60 may return a fail status. The receiving bank system 60 may store the status in a financial return entry and may communicate the return financial entry to the RDFI system 54 that, in turn, may communicate the financial return entry to the ODFI system 52 that, in turn, may communicate the financial return entry to the acquirer system 50 that, in turn may store the return financial return entry in an acquirer return file 58 and communicate the acquirer return file 58 to the network-based payment system 26 that, in turn, may update the receiver account 44 in the database 40 based on the return financial entry.

Figure 3:
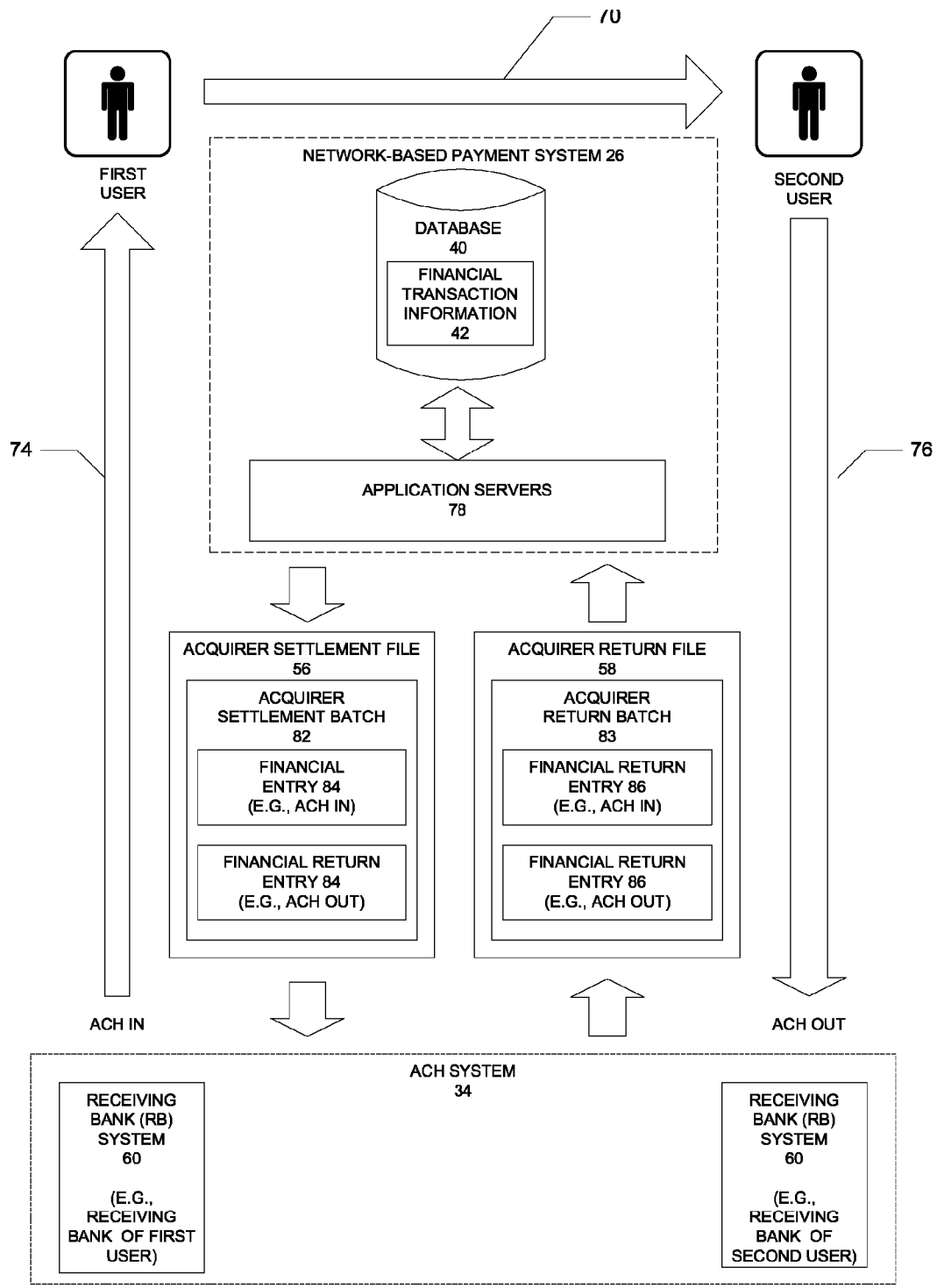
FIG. 3 is a block diagram illustrating a network-based payment system, used in an example embodiment of the present disclosure, to processes a payment between network-based payment system users.

FIG. 3 is a block diagram illustrating a payment 70 from a first user of a network-based payment system 26 to a second user of the network-based payment system 26, in an example embodiment of the present disclosure. The payment 70 causes a transfer 74 (ACH IN) of money from a receiving bank system 60 associated with the first user (e.g., first user account) and a transfer 76 (ACH OUT) of money to the receiving bank system 60 associated with the second user (e.g., second user account). The transfers 74, 76 are caused by the network-based payment system reading financial transaction information 42 from the database 40 and generating two financial entries 84 (ACH IN, ACH OUT) that are stored in an acquirer settlement file 56 that is communicated to the ACH system 34. Further, the financial entries 84 may respectively correspond to two return financial return entries 86 that respectively indicate the status of the financial entries. The return financial entries may be stored by the ACH system 34 in an acquirer return file 58 that may be communicated from the ACH system 34 to the network-based payment system 26.

The acquirer settlement file 56 is shown to include an acquirer settlement batch 82 that may include one or more financial entries 84. In general, the acquirer settlement batch 82 includes financial entries 84 of a common type (e.g., debit, credit, international, domestic, etc.). Other examples of acquirer settlement files 56 may include multiple acquirer settlement batches 82.

The acquirer return file 58 is shown to include an acquirer return batch 83 that includes multiple financial return entries 86. Each financial return entry 86 corresponds to a financial entry 84 that has been submitted to the ACH system 34 in an acquirer settlement file 56. Each financial return entry 86 may include a status as to the outcome of the corresponding financial entry 84. For example the financial return entry 86 (e.g., ACH IN) may indicate that the corresponding financial entry 84 (e.g., ACH IN) was successful or failed. The acquirer return file 58 may be used to update financial transaction information 42 in the database 40.

The acquirer settlement file 56 and the acquirer return file 58 must be formatted according to the requirements of a specific acquirer. For example, a specific acquirer (e.g., Netgiro, Wells Fargo, HSBC, etc.) may require a fixed length format, an extensible markup language (XML) format, a token delimited format or any combination thereof. The fixed length format may require a financial entry 84 to be fixed length and the financial return entry 86 to be a fixed length. The fixed length format may further require the data fields in the financial entry 84 and the financial return entry 86 to be a fixed length and to have a fixed meaning. The XML format may require the financial entry 84 and the financial return entry 86 to include XML which is a general-purpose markup language for creating special-purpose markup languages. The token delimited file may require the data fields in the in the financial entry 84 and the financial return entry 86 to be delimited by tokens which may include strings of varying length and characters (e.g., ,,,,,, xxxxx, ####). The format of the acquirer settlement file 56 and the acquirer return file 58 may be specified by various standards. One example standard may include the United Nations/Electronic Data Interchange for Administration for Trade Facilitation and Electronic Business (EDIFACT) standard, developed by the United Nations. Another example may include the National Automated Clearing House Association (NACHA) standard, developed by the National Automated Clearing House Association.

Platform Architecture

Figure 4:
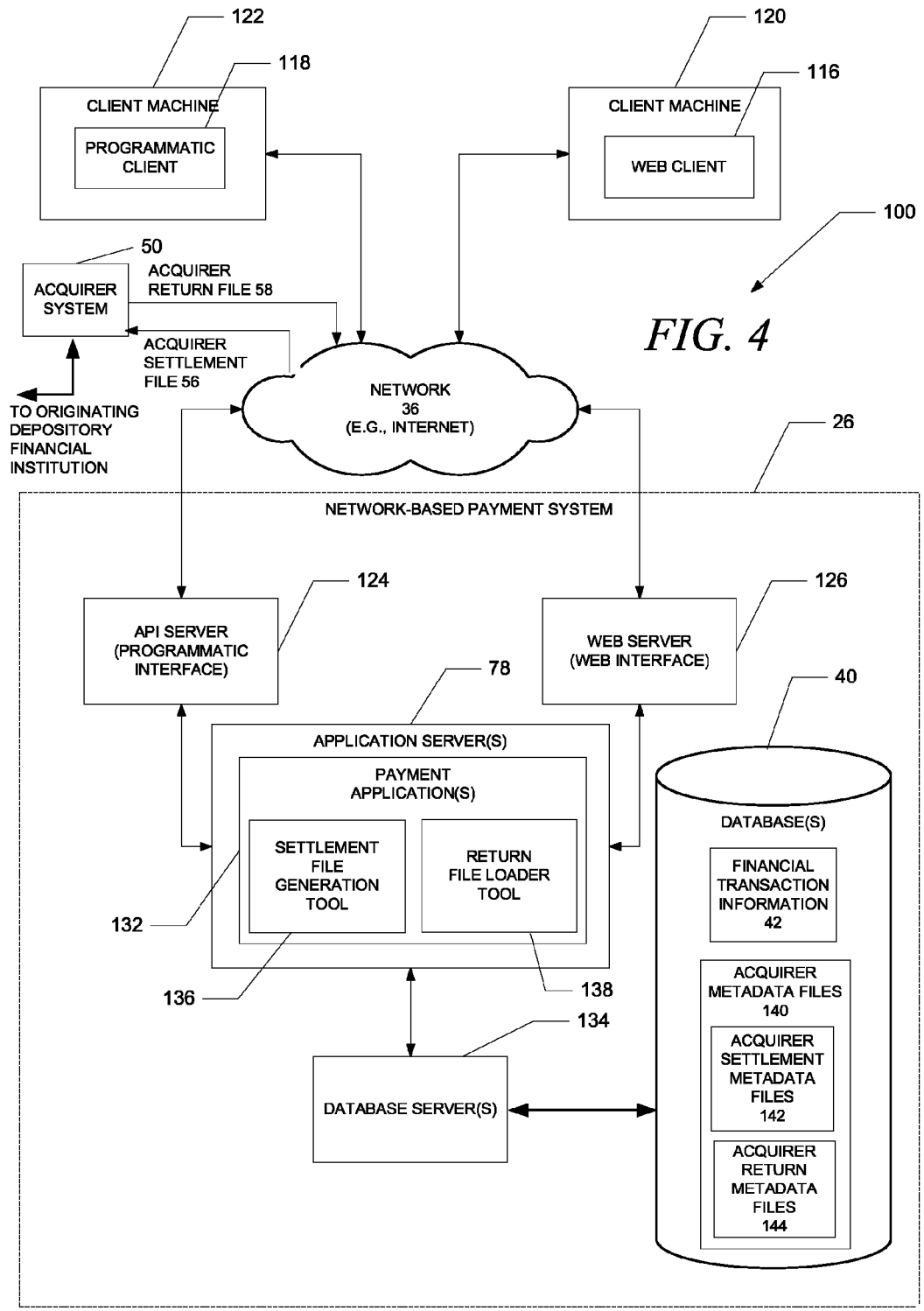
FIG. 4 is a block diagram illustrating a network-based payment system used in an example embodiment of the present disclosure.

FIG. 4 is a network diagram depicting a system 100, according to one exemplary embodiment of the present invention, having client-server architecture. A financial platform, in the exemplary form of a network-based payment system 26, provides server-side functionality, via a network 36 (e.g., the Internet) to one or more clients 120, 122 that may be operated by users. One embodiment of the network-based payment system 26 may be PayPal®, a network-based payment system provided by eBay of San Jose, Calif.

The system 100 includes a web client 116 (e.g., a browser, such as the Internet Explorer browser developed by Microsoft Corporation of Redmond, Wash.), and a programmatic client 118 executing on respective client machines 120 and 122. Turning specifically to the network-based payment system 26, an application program interface (API) server 124 and a web server 126 are coupled to, and provide programmatic and web interfaces respectively to, one or more application servers 78. The application servers 78 may host one or more payment applications 132. The application servers 28 are, in turn, shown to be coupled to one or more databases servers 134 that facilitate access to one or more databases 40.

The payment applications 132 may enable the users to make payments to other users, receive payment from other users, access credit services, access bank accounts, etc. For example the payment applications 132 may enable an individual or business with an email address to send and receive payments online by utilizing the existing financial infrastructure of bank accounts and credit cards. The payment applications 132 may include a settlement file generation tool 136 and a return file loader tool 138. The settlement file generation tool 136 may be used to process the financial transaction information 42 in the database 40 to generate the acquirer settlement file 56. The return file loader tool 138 may be used to parse the acquirer return file 58 to update or add (e.g., insert) financial transaction information 42 in the database 40.

Further, while the system 100 shown in FIG. 4 employs a client-server architecture, the present invention is of course not limited to such an architecture, and could equally well find application in a distributed, or peer-to-peer, architecture system. The various payment applications 132 could also be implemented as standalone software programs, which do not necessarily have networking capabilities.

The web client 116, it will be appreciated, accesses the various payment applications 132 via the web interface supported by the web server 126. Similarly, the programmatic client 118 accesses the various services and functions provided by the payment applications 132 via the programmatic interface provided by the API server 124.

The databases 40 include financial transaction information 42, as previously described, and acquirer metadata files 140. The acquirer metadata files 140 include acquirer settlement metadata files 142 and acquirer return metadata files 144. The acquirer settlement metadata files 142 respectively correspond to various acquirers (e.g., Netgiro, Wells Fargo, HSBC, etc.) and may be utilized by the settlement file generation tool 136 to read financial transaction information 42 from the database 40 and generate an acquirer settlement file 56. The acquirer return metadata files 144 respectively correspond to various acquirers (e.g., Netgiro, Wells Fargo, HSBC, etc.) and may be utilized by the return file loader tool 138 to process an acquirer return file 58 and update and/or add (e.g., insert) financial transaction information 42 in the database 40.

FIG. 4 also illustrates an acquirer system 50 as having programmatic access to the network-based payment system 26 via the programmatic interface provided by the API server 124. For example, the acquirer system 50 may receive acquirer settlement files 56 from the network-based payment system 26 and communicate acquirer return files 58 to the network-based payment system 26, as previously described.

Figure 5:
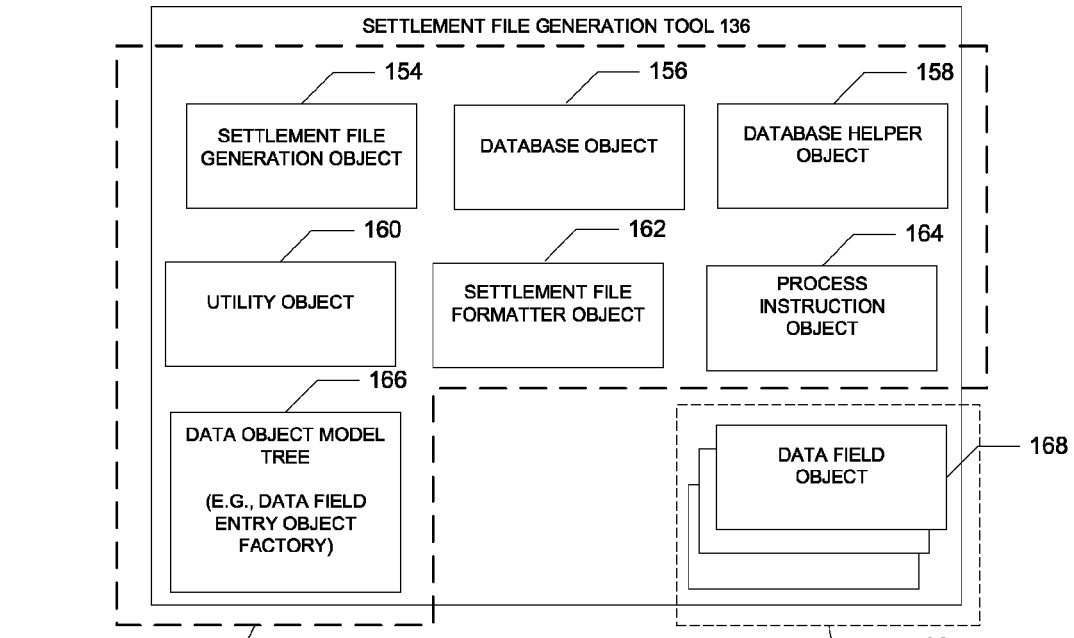
FIG. 5 is a block diagram illustrating a settlement file generation tool used in an example embodiment of the present disclosure.

FIG. 5 is a block diagram illustrating a settlement file generation tool 136 used in an example embodiment of the present disclosure. The settlement file generation tool 136 includes acquirer independent software components 150 and acquirer dependent software components 152.

The acquirer independent software components 150 may be utilized to generate an acquirer settlement file 56 for any vendor/acquirer (e.g., Netgiro, Wells Fargo, HSBC, etc.). In contrast, the acquirer dependent software components 152 are generated for a particular vendor/acquirer based on the corresponding acquirer settlement metadata file 142 and are used to generate an acquirer settlement file 56 with semantics and formatting that may be processed by a specific vendor/acquirer. The acquirer independent software components 150 may include a settlement file generation object 154, a database object 156, a database helper object 158, a utility object 160, a settlement file formatter object 162, a process instruction object 164, and a data object model tree 166.

The settlement file generation object 154 may open the appropriate acquirer settlement metadata file 142, format the acquirer settlement file 56, and invoke the other objects in the settlement file generation tool 136 (e.g., database object 156, database helper object 158, utility object 160, settlement file formatter object 162, process instruction object 164, data object model tree 166, data field objects 168) to generate the acquirer settlement file 56. The database object 156 may parse the acquirer settlement metadata file 142 and read the financial transaction information 42 from the database 40 (e.g., rows from tables). The database helper object 158 may create the acquirer settlement file 56, format the acquirer settlement file 56, and interact or communicate with the data field objects 168 to perform variable substitution on data, as described further below. The utility object 160 may interact or communicate with the data field objects 168 to read the financial transaction information 42 (e.g., data) from the database 40. The settlement file formatter object 162 may interact or communicate with the data field objects 168 to encode data. For example, in one embodiment the database 40 may store financial transaction information 42 in UTF-8 encoding. Nevertheless, a particular acquirer system 50 may require that data in the acquirer settlement files 56 be encoded in another encoding type (e.g., Windows 3052, GB231, etc.). The process instruction object 164 may be utilized to execute an instruction (e.g., process instruction, SQL statement, etc) that may be read from the acquirer settlement metadata file 142. For example, the process instruction object 164 may execute an SQL statement to select financial transaction information 42 (e.g., rows from table(s)) from the database 40. The data object model (DOM) tree 166 may be utilized to instantiate the data field objects 168. For example the DOM tree 166 may be loaded with an acquirer settlement metadata file 142 and the DOM tree 166 may generate data field objects 168. Each data field object 168 may correspond to data (e.g., financial entry data) in the financial entry 84 and may include functions and/or data structures that may be generated based on the location of the data in a financial entry 84 as represented in a template (e.g., financial entry template) and a set of corresponding set of attributes. For example, the attributes of the data may include a type, a format, encoding, a source and a sink, as described further below.

Figure 6:
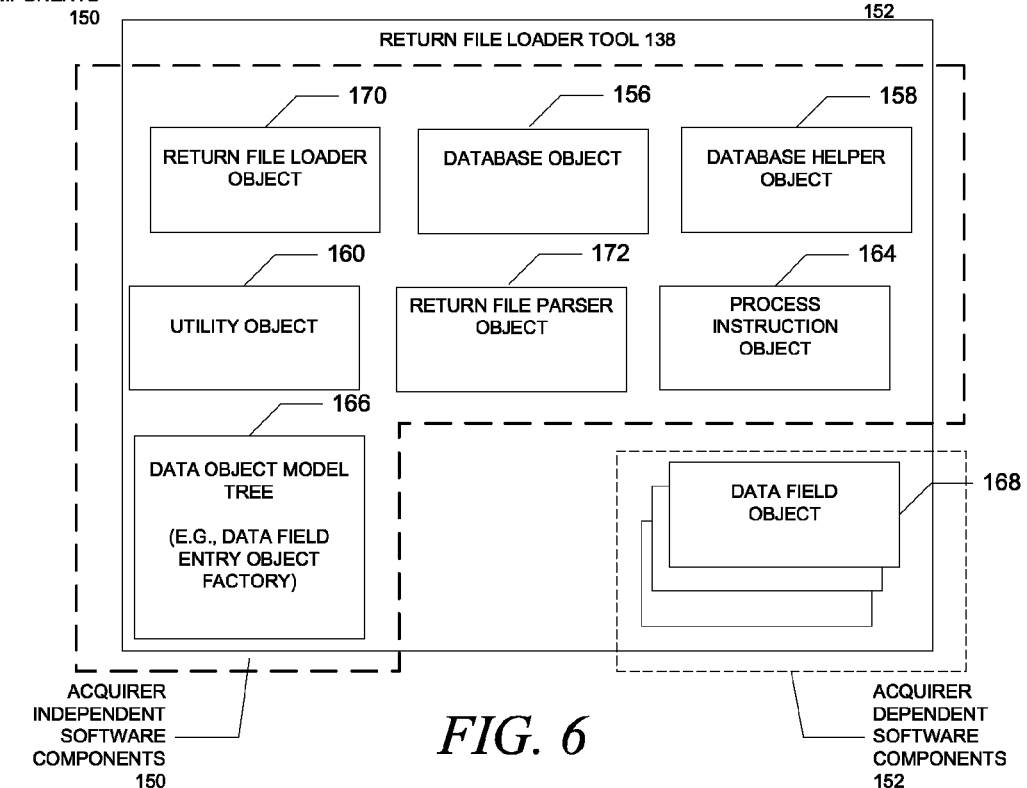
FIG. 6 is a block diagram illustrating a return file loader tool used in an example embodiment of the present disclosure.

FIG. 6 is a block diagram illustrating a return file loader tool 138 used in an example embodiment of the present disclosure. The return file loader tool 138 includes acquirer independent software components 150 and acquirer dependent software components 152. The acquirer independent software components 150 may be utilized to process an acquirer return file 58 that may be received from any vendor/acquirer (e.g., Netgiro, Wells Fargo, HSBC, etc). In contrast, the acquirer dependent software components 152 are used to process an acquirer return file 58 that is received from a particular vendor/acquirer (e.g., Netgiro, Wells Fargo, HSBC, etc.). The acquirer independent software components 150 may include a return file loader object 170, a database object 156, a database helper object 158, a utility object 160, a return file parser object 172, a process instruction object 164, and a data object model (DOM) tree 166. The return file loader object 170 opens the acquirer return file 58 that has been received from an acquirer system 50, opens the appropriate acquirer return metadata file 144 based on the received acquirer return file 58, and communicates with other objects in the return file loader tool 138 (e.g., database object 156, database helper object 158, utility object 160, return file parser object 172, process instruction object 164, DOM tree 166, data field objects 168) to parse the acquirer return file 58 and update of the financial transaction information 42 in the database 40. For example, the database object 156 may insert rows into a financial transaction table. The database helper object 158 may assemble data in a row that may be updated to a table (e.g., financial transaction information 42). The utility object 160 may communicate or interact with the data field objects 168 to perform validation on data received via a financial return entry 86. The return file parser object 172 may be used to parse data in the financial return entry 86 and to encode the data before the data is updated to the database 40. The process instruction object 164 may execute instructions (e.g., process instructions, SQL statements—insert, update, etc) in the acquirer return metadata file 144. The data object model (DOM) tree 166 may be utilized to instantiate the data field objects 168. For example, the DOM tree 166 may be loaded with an acquirer return metadata file 144 to generate data field objects 168. Each data field object 168 may correspond to data (e.g., financial return entry data) in the financial return entry 86 and may include functions and/or data structures that may be generated based on the location of the data in a financial return entry 86 as represented in a template (e.g., financial entry template) and a set of corresponding attributes. For example, the attributes of the data may include a type, a format, encoding, a source, and a sink, as described further below.

Data Structures

Figure 7:
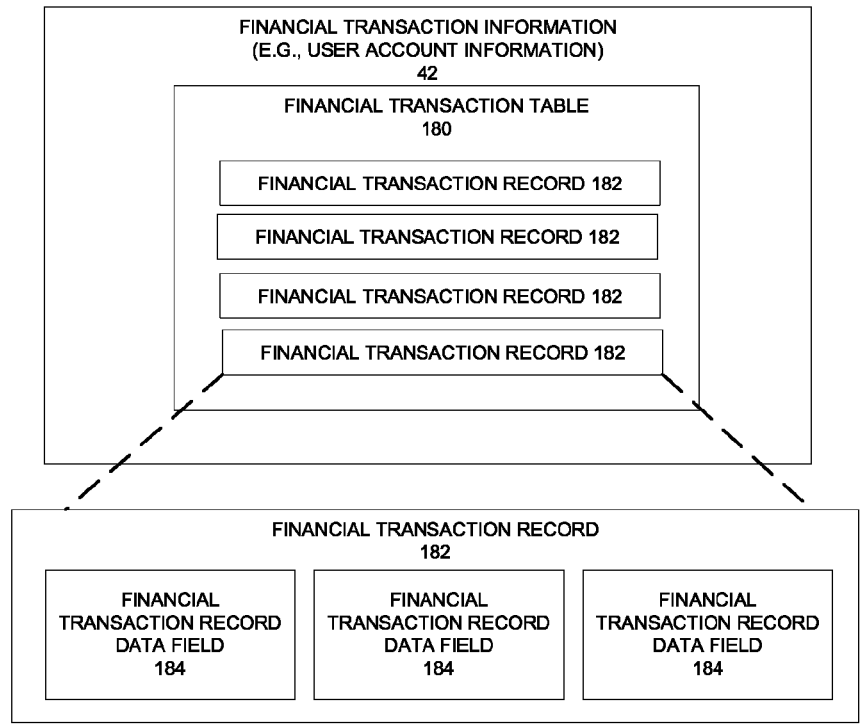
FIG. 7 is a block diagram illustrating financial transaction information used in an example embodiment of the present disclosure.

FIG. 7 is a block diagram illustrating financial transaction information 42 used in an example embodiment of the present disclosure. The financial transaction information 42 may be embodied as user account information in the form of a financial transaction table 180 that may include financial transaction records 182. Each financial transaction record 182 is shown to include one or more financial transaction record data fields 184 (e.g., columns in the financial transaction table 180) that may store data. Other embodiments may include financial transaction information that includes multiple financial transaction tables 180.

Figure 8:
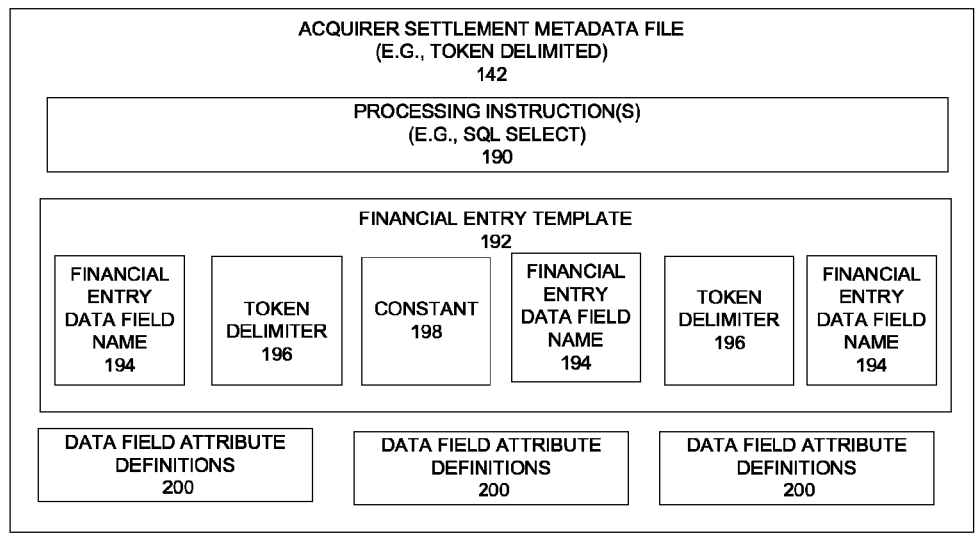
FIG. 8 is a block diagram illustrating an acquirer settlement metadata file used in an example embodiment of the present disclosure.

FIG. 8 is a block diagram illustrating an acquirer settlement metadata file 142 used in an example embodiment of the present disclosure. The acquirer settlement metadata file 142 may be utilized by the settlement file generation tool 136 to select the financial transaction records 182, to read data from the financial transaction record data fields 184 in the financial transaction records 182, and to generate a financial entry 84 that may be stored in an acquirer settlement file 56. The acquirer settlement metadata file 142 is shown to include processing instructions 190, a financial entry template 192, and multiple data field attribute definitions 200. The processing instructions 190 may include, for example, an SQL select statement that may be utilized by the settlement file generation tool 136 to select a set of financial transaction records 182 from a financial transaction table 180. For example, the processing instructions 190 may select credit transactions (e.g., financial transaction records 182 describing credit transactions). In yet another example, the processing instructions 190 may select transactions processed by a foreign bank (e.g. Central Bank of China, Deutsche Bank AG, Suisse Bank, etc.). The financial entry template 192 is shown to include financial entry data field names 194, token delimiters 196, constants 198.

The financial entry template 192 may be used by the settlement file generation tool 136 to generate data field objects 168 that may be used to generate a financial entry 84. For example, the financial entry data field names 194 may identify the relative position of each of the financial entry data fields in the financial entry 84, the token delimiters 196 (e.g., ,,,,, xxxxx,

) may identify the relative position of each of the token delimiters 196 in the financial entry 84, and the constants 198 may identify the relative position of each of the constants 198 in the financial entry 84. Each set of data field attribute definitions 200 corresponds to a financial entry data field name 194. For example, five sets of data field attribute definitions 200 may respectively correspond to five financial entry data field names 194. A single set of data field attribute definitions 200 may also be used to generate a corresponding data field object 168 that may be used to process a financial return entry 86. Each set of data field attribute definitions 200 defines attributes of the data that may be identified with the financial entry data field entry name 194 (e.g., a type, a position, a format, encodings, a sink, a source, etc.).

Figure 9:
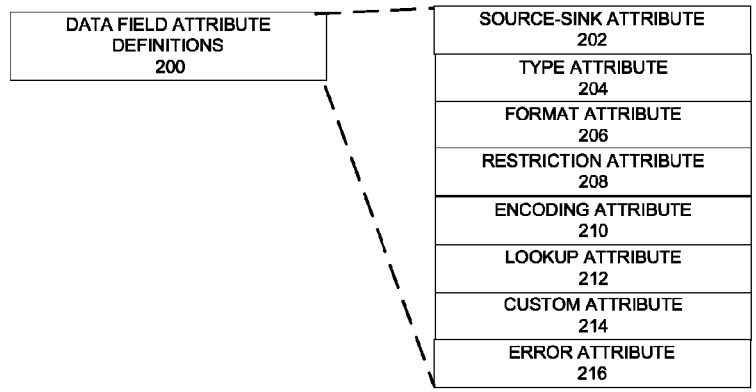
FIG. 9 is a block diagram illustrating data field definitions used in an example embodiment of the present disclosure.

FIG. 9 is a block diagram illustrating a set of data field attribute definitions 200 used in an example embodiment of the present disclosure. Each set of data field attribute definitions 200 may be used by the data object model tree 166 to generate a data field object 168 that may be used to process corresponding data. The data field attribute definitions 200 may define attributes of the data and may include a source-sink attribute 202, a type attribute 204, a format attribute 206, a restriction attribute 208, an encoding attribute 210, a lookup attribute 212, a custom attribute 214 and an error attribute 216.

The source-sink attribute 202 may identify a column in a financial transaction record 182. Accordingly, the settlement file generation tool 136 may be read data from the financial transaction record 182 via a data field object 168 that has been generated according to the source-sink attribute 202. In addition, the return file loader tool 138 may update data to the financial transaction record 182 via the data field object 168 that has been generated according to the source-sink attribute 202.

The type attribute 204 may be used to identify the type of data. For example, the type attribute may include a string, an integer, a long, a short, etc. Accordingly, the settlement file generation tool 136 may type data via a data field object 168 that has been generated according to the type attribute 204. In addition, the return file loader tool 138 may type data via the data field object 168 that has been generated according to the type attribute 204.

The format attribute 206 may include information that may be utilized to format data. For example, the format attribute 206 may be used to left justify or right justify data within a field, to pad a data with a particular character (e.g., blanks), or to insert a decimal point in data. Accordingly, the settlement file generation tool 136 may format data via a data field object 168 that has been generated according to the format attribute 206. In addition the return file loader tool 138 may format data via the data field object 168 that has been generated according to the format attribute 206.

The restriction attribute 208 may specify maximum and minimum limits to determine whether data is valid. Accordingly, the settlement file generation tool 136 may validate data via a data field object 168 that has been generated according to the restriction attribute 208. In addition, the return file loader tool 138 may validate data via a data field object 168 that has been generated according to the restriction attribute 208. If the data is not valid then the settlement file generation tool 136 or the return file loader tool 138 may respond by executing an error recovery procedure via the data field object 168 as defined by the error attribute 216.

The encoding attribute 210 may specify an encoding for a particular acquirer system 50 (e.g., vendor). For example, the database 40 may store data that is encoded in UTF-8 and an acquirer system 50 may require GB321 encoding (e.g., Chinese). Accordingly, the settlement file generation tool 136 may encode data via a data field object 168 that has been generated according to the encoding attribute 210 (e.g., UTF-8 to GB321). In addition the return file loader tool 138 may encode data via a data field object 168 that has been generated according to the encoding attribute 210 (e.g., GB321 to UTF-8).

The lookup attribute 212 may specify a table to perform a lookup operation. For example, data that has been retrieved by a settlement file generation tool 136 or a return file loader tool 138 may be used to lookup a value (e.g., string) in a table via a data field object 168 that has been generated according to a lookup attribute 212.

The custom attribute 214 may be utilized by the settlement file generation tool 136 or the return file loader tool 138 to trigger custom processing via a data field object 168 that has been generated according to the custom attribute 214.

Figure 10:
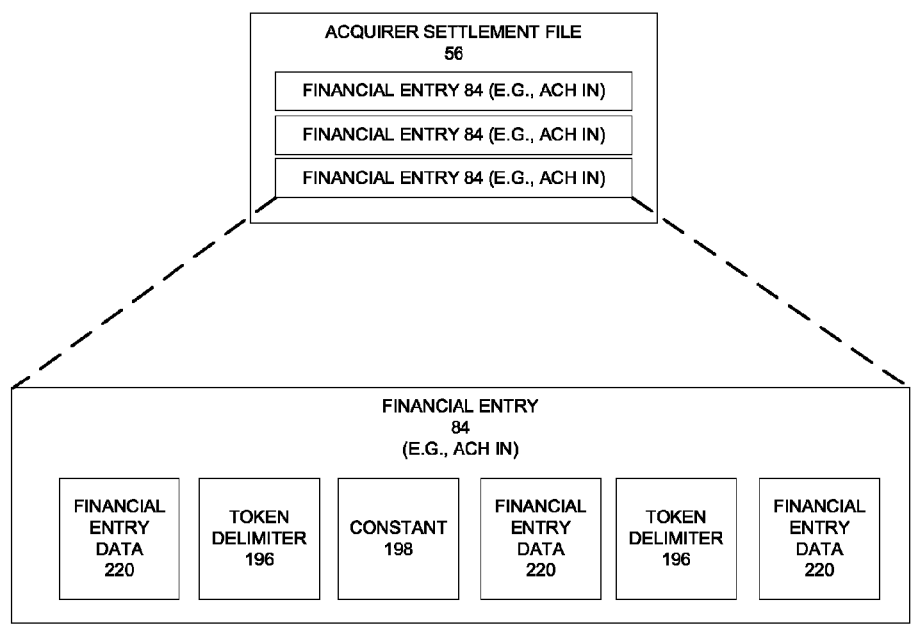
FIG. 10 is a block diagram illustrating an acquirer settlement file used in an example embodiment of the present disclosure.

FIG. 10 is a block diagram illustrating an acquirer settlement file 56 used in an example embodiment of the present disclosure. The acquirer settlement file 56 is shown to include multiple financial entries 84. Each financial entry 84 may include one or more financial entry data 220, one or more token delimiters 196, and one or more constants 198. The financial entry data 220 may include an order identifier, a transaction identifier, an amount, a transaction type or any other type of data that may be required by an acquirer to execute a transaction. The token delimiter 196 may be used to delimit financial entry data 220 and constants 198.

Figure 11:
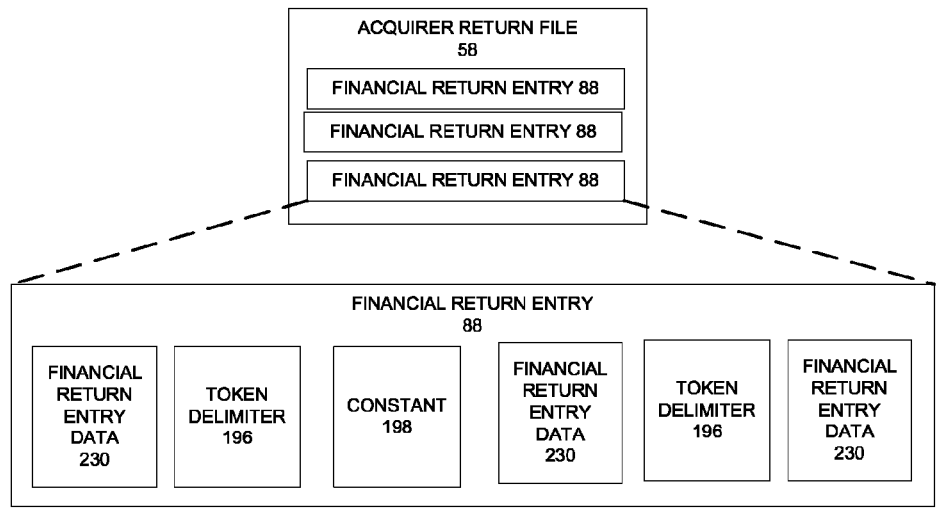
FIG. 11 is a block diagram illustrating an acquirer return file used in an example embodiment of the present disclosure.

FIG. 11 is a block diagram illustrating an acquirer return file 58 used in an example embodiment of the present disclosure. The acquirer return file 58 is shown to include one or more financial return entries 86. Each financial return entry 86 may include one or more fields to store financial return entry data 230, one or more token delimiters 196 and one or more constants 198.

Figure 12:
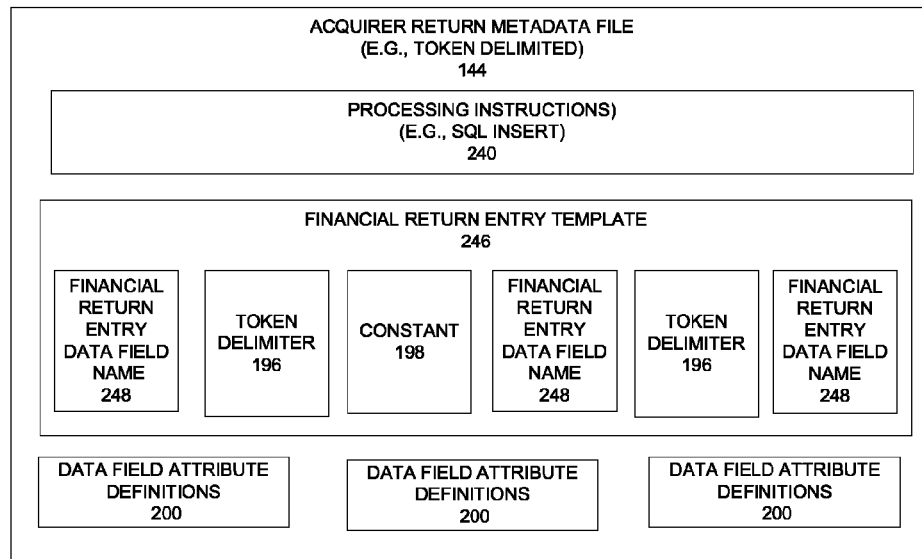
FIG. 12 is a block diagram illustrating an acquirer return metadata file used in an example embodiment of the present disclosure.

FIG. 12 is a block diagram illustrating an acquirer return metadata file 144 used in an example embodiment of the present disclosure. The acquirer return metadata file 144 may be utilized by the return file loader tool 138 to parse data from a financial return entry 86, process the data, and store the data in a financial transaction record 182 in a financial transaction table 180 in the database 40. The acquirer return metadata file 144 is shown to include processing instructions 240, a financial return entry template 246 and one or more data field attribute definitions 200. The processing instructions 240 may be utilized by the return file loader tool 138 to insert or update a financial transaction record 182 in a financial transaction table 180 in the database 40. For example, the processing instruction may include an SQL insert or update statement.

The financial return entry template 246 may be utilized by the return file loader tool 138 to generate data field objects 168 that may be used to process a financial return entry 86. The financial return entry template 246 may include one or more financial return entry data field names 248, one or more token delimiters 196, and one or more constants 198. The financial return entry data field names 248 may identify the relative position of each of the fields to store financial return entry data 230 in the financial return entry 86 and the token delimiters 196 (e.g., ,,,,, xxxxx, ###) may identify the relative position of each of the token delimiters 196 in the financial return entry 86 and the constants 198 may identify the relative position of each of the constants 198 (e.g., any alphanumeric or special character(s)) in the financial return entry 86. Each set of data field attribute definitions 200 corresponds to a financial return entry data field name 148. For example, five financial return entry data field names 248 may respectively correspond to five sets of data field attribute definitions 200. A single set of data field attribute definitions 200 may also be used to generate a corresponding data field object 168 that may be used to process a financial return entry 86. Each set of data field attribute definitions 200 may describe multiple attributes of the data associated financial entry data field entry name 194 (e.g., a type, a position, a format, encodings, a sink, a source, a lookup table, custom processing, restrictions, etc.), as previously described.

Flowcharts

Figure 13:
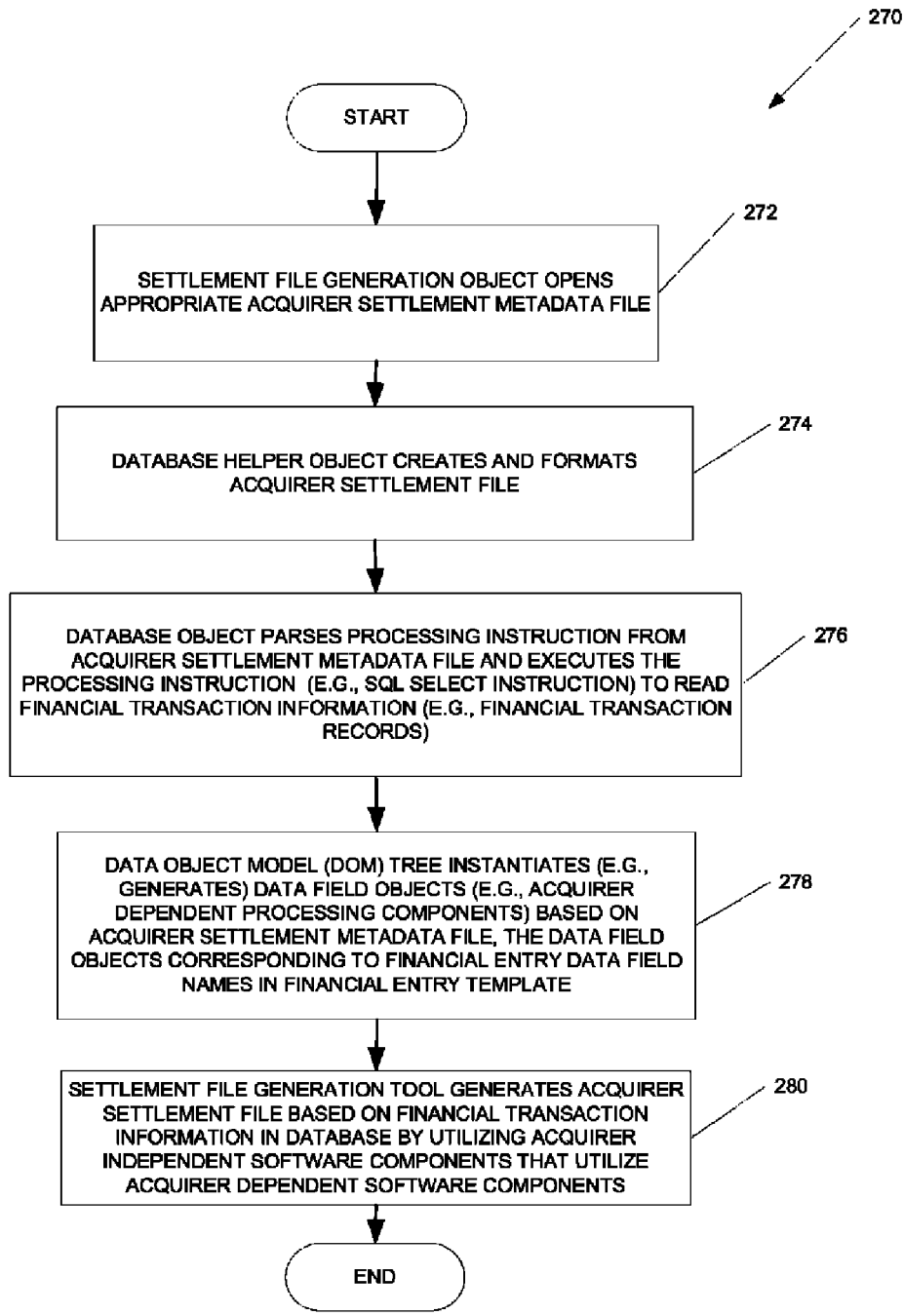
FIG. 13 is a block diagram illustrating a method, used in an example embodiment of the present disclosure, to generate an acquirer settlement file.

FIG. 13 is a block diagram illustrating an exemplary method 270, used in an example embodiment of the present disclosure, to generate an acquirer settlement file 56. The method 270 commences at operation 272 with the settlement file generation object 154 opening the appropriate acquirer settlement metadata file 142. For example, the settlement file generation object 154 may be scheduled with a script that passes arguments to the settlement file generation object 154 that identify the acquirer (e.g., Netgiro, Wells Fargo, HSBC) and the type of transactions to process (e.g., domestic credit transactions). Another example may include the settlement file generation object 154 receiving the same arguments from an operator.

At operation 274, the database helper object 158 may open (e.g., create) and format the acquirer settlement file 56. For example the database helper object 158 may write headers into the acquirer settlement file 56 based on header information in the acquirer settlement metadata file 142.

At operation 276, the database object 156 parses a processing instruction 190 from the acquirer settlement metadata file 142 and executes the processing instruction 190 to read financial transaction information 42 from the database 40. For example, the database object 156 may select a set of credit transaction records 182 from a transaction table 180 based on predefined criteria in the process instruction 190 and arguments passed to the settlement file generation object 154.

At operation 278 the DOM tree 166 loads the identified acquirer settlement metadata file 142 and instantiates data field objects 168 based on the financial entry data field names 194 in financial entry template 192 and respective sets of data field attribute definitions 200. Accordingly, the data field objects 168 respectively correspond to the financial entry data field names 194 in the financial entry template 192.

At operation 280, the settlement file generation tool 136 may generate an acquirer settlement file 56 based on the financial transaction records 182 (e.g., financial transaction information 42) that were selected from the database 40. For example, the settlement file generation tool 136 may include acquirer independent software components 150 that may utilize the respective acquirer dependent software components 152 (e.g., the data field objects 168) to process respective data for storage in a financial entry 84 for storage in the acquirer settlement file.

Figure 14:
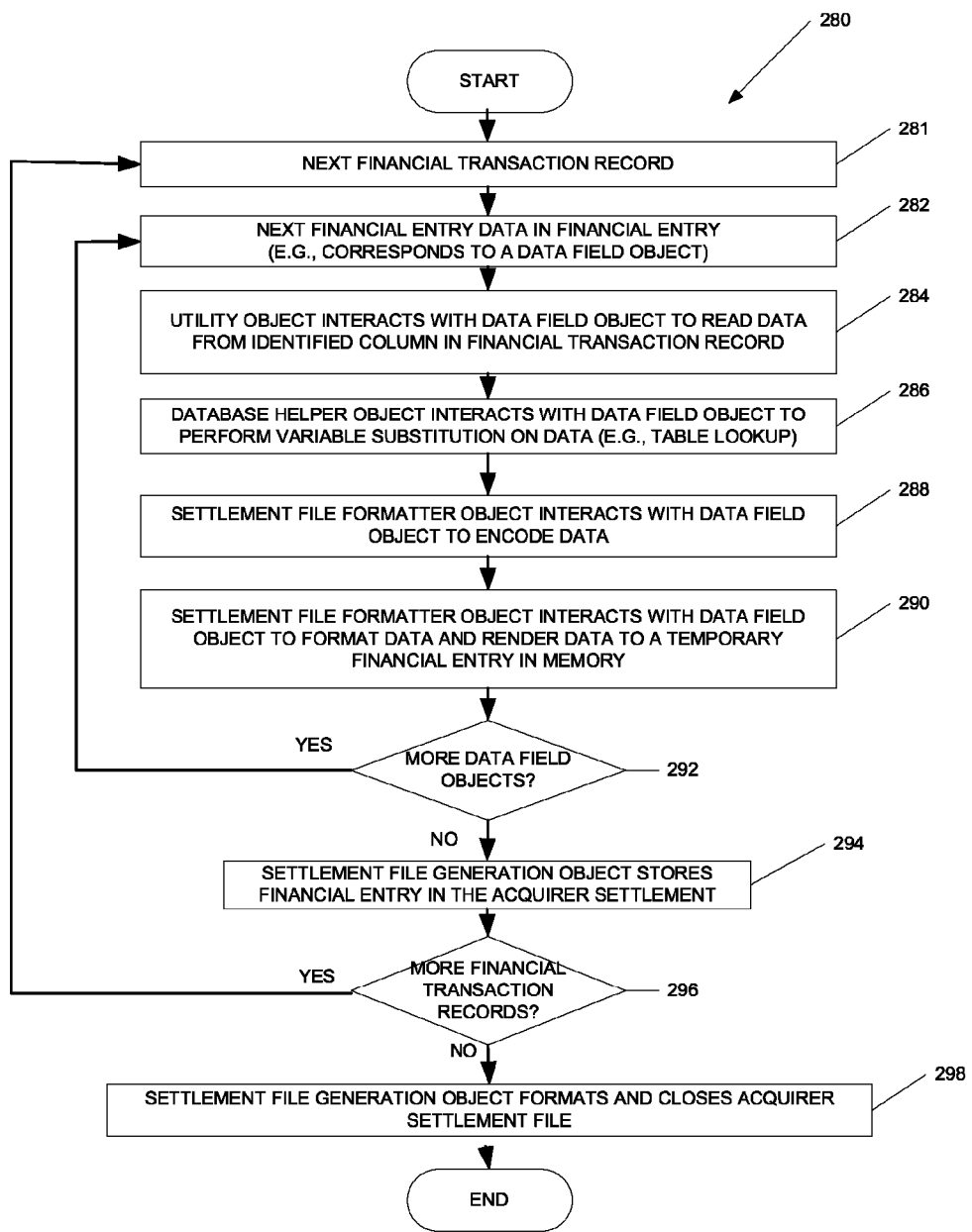
FIG. 14 is a block diagram illustrating a method, used in an example embodiment of the present disclosure, to generate an acquirer settlement file.

FIG. 14 is a block diagram illustrating a method 280, used in an example embodiment of the present disclosure, to generate an acquirer settlement file 56. The method 280 commences at operation 281 with the settlement file generation tool 136 processing the next financial transaction record 182. At operation 282, the settlement file generation tool 136 processes the next financial entry data 220 (e.g., corresponds to the next data field object 168) in the financial entry 84.

At operation 284, the utility object 160 communicates or interacts with the current data field object 168 to read data from the corresponding financial transaction record data field 184 in the financial transaction record 182. For example, the utility object may read an amount (e.g., data) from the financial transaction record 182 via the current data field object 168. In yet another example the data may be embodied as an order identifier or a transaction identifier.

At operation 286, the database helper object 158 may interact or communicate with the current data field object 168 to perform a variable substitution on the data. For example, the database helper object 158 may use the current data field object 168 to identify a lookup table in the database 40, index into the table based on the previously read data, and retrieve other data (e.g., a string) from the table.

At operation 288, the settlement file formatter object 162 interacts or communicates with the current data field object 168 to encode the data. For example, the current data field object 168 may change the encoding of the data from UTF-8 encoding to GB231 encoding.

At operation 290, the settlement file formatter object 162 interacts or communicates with the current data field object 168 to format the data and render the data to a financial entry 84 that is stored in memory. For instance the settlement file formatter object 162 may left justify the data. Further, the settlement file formatter object 162 pad the data with blanks or some other character.

At decision operation 292, the settlement file generation object 154 determines if there are more data field objects 168 to process. If there are more data field objects 168 to process then a branch is made to operation 282. Otherwise a branch is made to operation 294.

At operation 294, the settlement file generation tool 136 stores the financial entry 84 to the acquirer settlement file 56.

At operation 296, the settlement file generation tool 136 determines if there are more financial transaction records 182 to be processed. If there are more financial transaction records 182 to be processed then a branch is made to operation 281. Otherwise a branch is made to operation 298.

At operation 298, the settlement file generation object 154 formats and closes the acquirer settlement file 56 and the method 270 ends. For example, the settlement file generation object 154 may write a trailer to the acquirer settlement file 56 before closing the acquirer settlement file 56.

Figure 15:
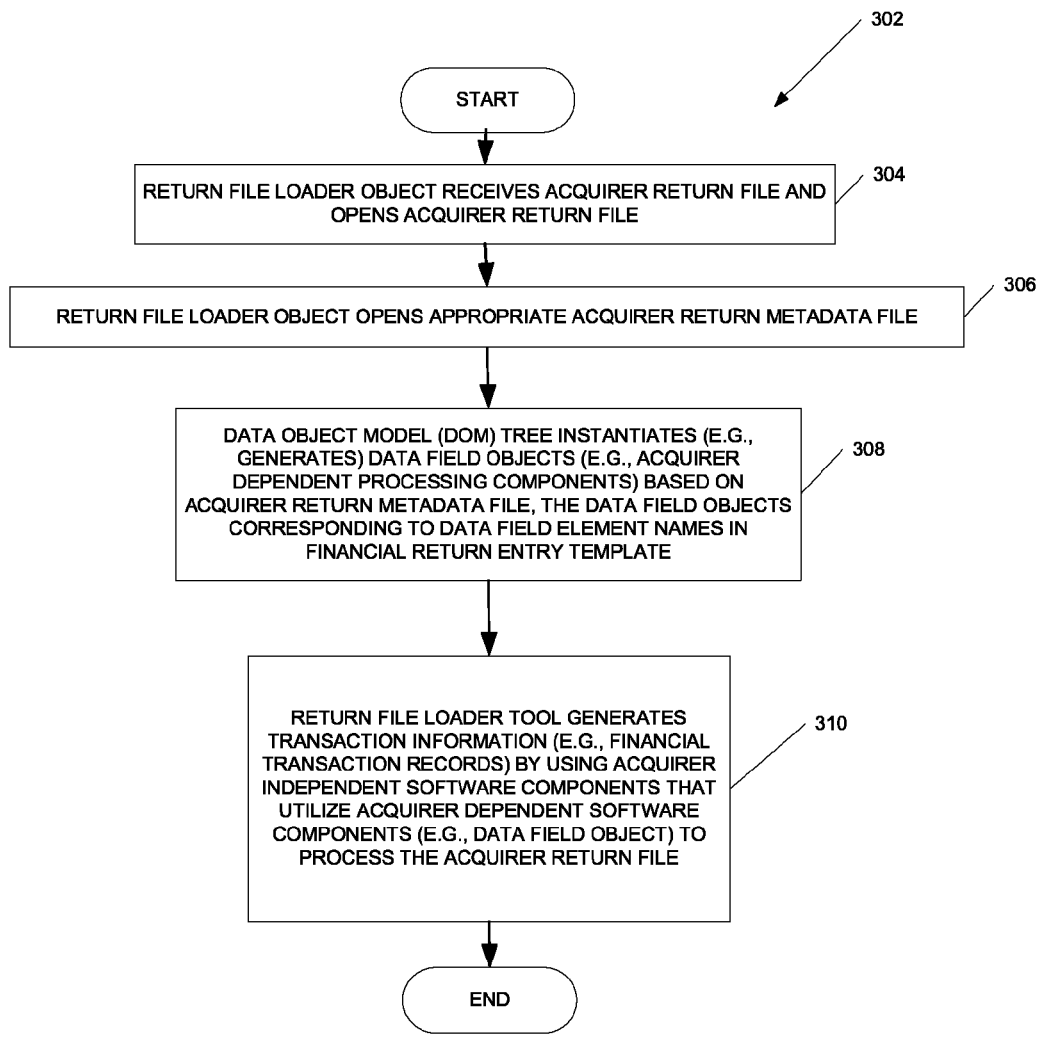
FIG. 15 is a block diagram illustrating a method, used in an example embodiment of the present disclosure, to process an acquirer return file.

FIG. 15 is a block diagram illustrating a method 302, used in an example embodiment of the present disclosure, to process an acquirer return file 58. At operation 304, the return file loader object 170 opens the acquirer return file 58 that has been received from an acquirer system 50.

At operation 306, the return file loader object 170 opens the appropriate acquirer return metadata file 144 based on the identity of the acquirer system 50 (e.g., Netgiro, Wells Fargo, HSBC). In one embodiment, the identity of the acquirer system 50 may be stored in the acquirer return file 58.

At operation 308, the data object model tree 166 instantiates or generates data field objects 168 based on the respective financial return entry data field names 248 in the financial return entry template 246 and the corresponding data field definitions 200 in the acquirer return metadata file 144. Accordingly, the number of data field objects 168 may correspond to the number of financial return entry data field names 248 found in the financial return entry template 246.

At operation 310, the return file loader tool 138 generates financial transaction information 42 that may be stored in the database 40 by processing the acquirer return file 56. For example, the return file loader tool 138 may include acquirer independent software components 150 that utilize acquirer dependent software components 152 (e.g., data field objects 168) to process the acquirer return file 56 and generate financial transaction records 182 that may be stored in the financial transaction table 180 in the database 40.

Figure 16:
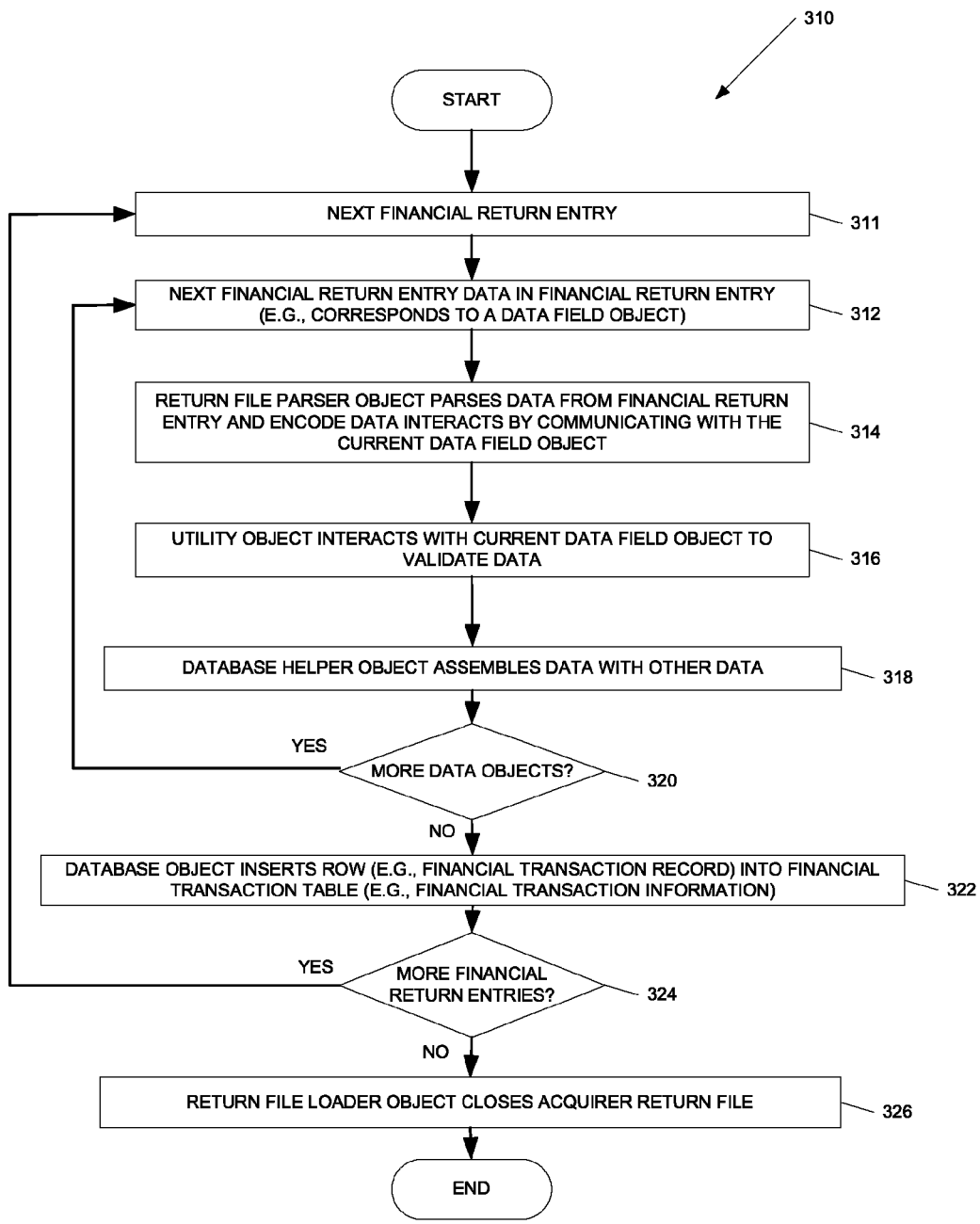
FIG. 16 is a block diagram illustrating a method, used in an example embodiment of the present disclosure, to process an acquirer return file.

FIG. 16 is a block diagram illustrating a method 310, used in an example embodiment of the present disclosure, to process an acquirer return file 58. The method 310 commences at operation 311 with the return file loader object 170 processing the next financial return entry 86 in the acquirer return file 58.

At operation 312, the return file loader object 170 processes the next financial return entry data 230 in the financial return entry data 230 (e.g., next data field object 168) in the current financial return entry 86.

At operation 314, the return file parser object 172 parses data from the financial return entry 86. For example, the return file parser object 172 may utilize the current data field object 168 to read the current financial return entry data 230 from the financial return entry 86. In addition, the return file parser object 172 may interact or communicate with the current data field object 168 to encode the data. For example, if the data field object 168 identifies the encoding of the data in the financial return entry 86 as different from the encoding of the data in the database 40 then the current data field object 168 may change the encoding of the data.

At operation 316, the utility object 160 may interact or communicate with the current data field object 168 to validate the data. For example, the utility object 160 may interact with the current data field object 168 to determine whether the data is greater than a maximum limit (e.g., invalid data) or less than a minimum limit (e.g., invalid data). If the data is invalid then data field object 168 may execute error recovery procedures.

At operation 318, the database helper object 158 may store the data in memory with other data that has been previously stored in memory in preparation of inserting a row into a financial transaction table 180.

At decision operation 320, the return file loader object 170 determines if there are more data field objects 168 (e.g., corresponding to financial return entry data 230 in the financial return entry 88) to process. If there are more data field objects 168 to process, then a branch is made to operation 312. Otherwise a branch is made to operation 322.

At operation 322, the database object 156 inserts a financial transaction record 182 (e.g., row) into the financial transaction table 180. For example, the database object 156 may utilize the process instruction object 164 to read processing instructions 240 from the acquirer return metadata file 144 and execute the processing instructions (e.g., SQL insert statement).

At decision operation 324, the return file loader object 170 determines if there are more financial return entries 86 in the acquirer return file 58. If there are more financial return entries 86 then a branch is made to operation 311. Otherwise a branch is made to operation 326. At operation 326, the return file loader object 170 closes the acquirer return file 58 and the method ends.

Figure 17:
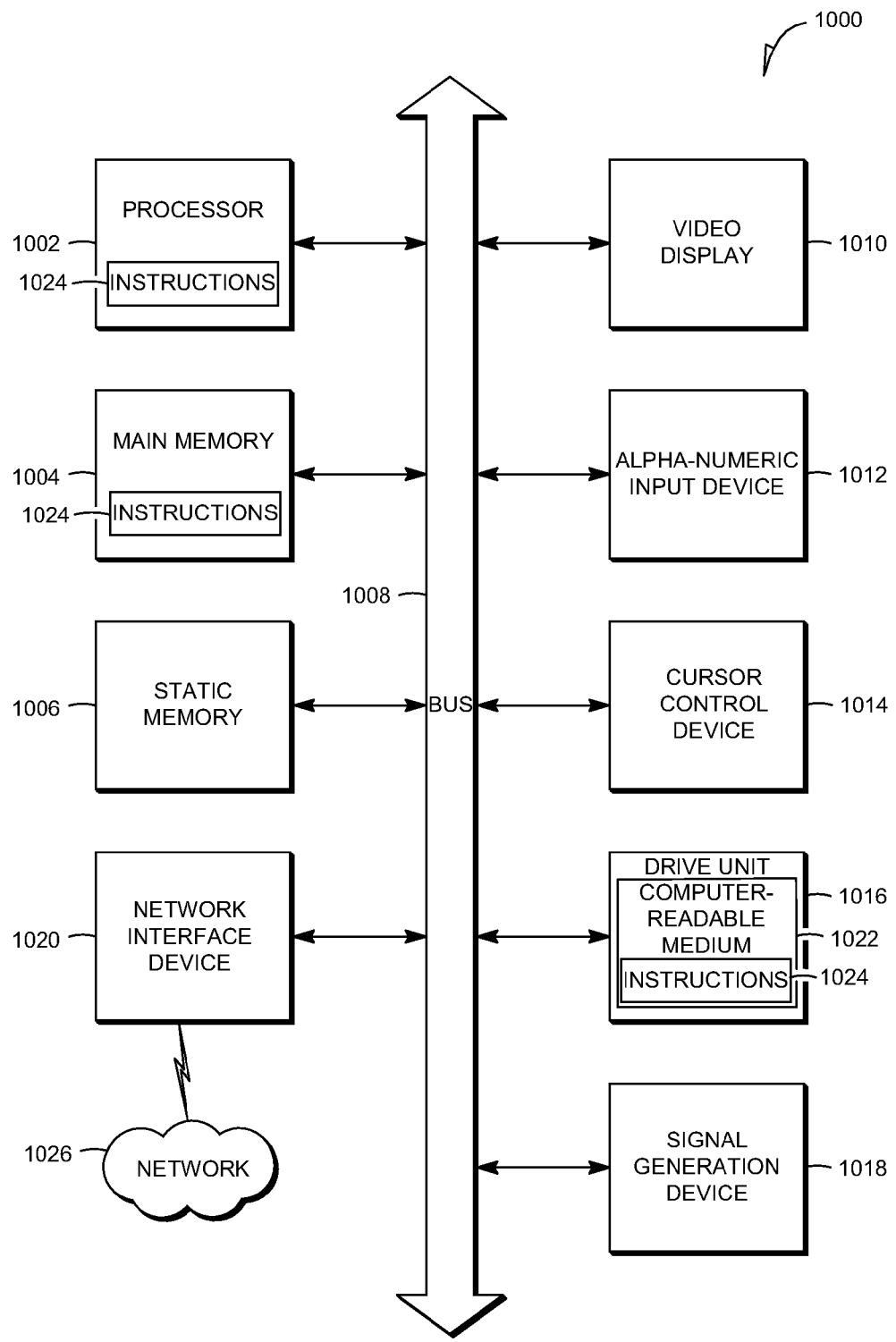
FIG. 17 shows a diagrammatic representation of machine in the example form of a computer system within which a set of instructions, for causing the machine to perform any one or more of the methodologies discussed herein, may be executed.

FIG. 17 shows a diagrammatic representation of machine in the exemplary form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a metadata driven method and system to process financial data has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system including:
   a plurality of acquirer settlement metadata files that includes a first acquirer settlement metadata file that corresponds to a first acquirer, the first acquirer used to access a financial clearing house system;
   a database that stores financial transaction information; and
   a settlement file generation tool that includes a plurality of acquirer independent software components and a plurality of first acquirer dependent software components, the plurality of first acquirer dependent software components being based on the first acquirer settlement metadata file, the acquirer independent software components utilizing the plurality of first acquirer dependent software components to generate a first acquirer settlement file that enables the first acquirer to process the financial transaction information in the financial clearing house system.

2. The system of claim 1, wherein the first acquirer dependent software component includes a first data field object that is utilized to format data that is stored in a financial entry in the first acquirer settlement file.

3. The system of claim 1, wherein the plurality of acquirer settlement metadata files are respectively utilized by the settlement file generation tool to respectively generate a plurality of acquirer settlement files that are respectively formatted for a plurality of different acquirers.

4. The system of claim 1, wherein the first acquirer settlement metadata file includes a financial entry template used to generate a financial entry stored in the first acquirer settlement file.

5. The system of claim 4, wherein the financial entry includes an automatic clearing house (ACH) transaction.

6. The system of claim 4, wherein the financial entry template includes a financial entry data field name that is associated with a set of data field attribute definitions selected from the group consisting of a source-sink attribute, a type attribute, a format attribute, a restriction attribute, an encoding attribute, a lookup attribute, a custom attribute, and an error attribute.

7. The system of claim 6, wherein the plurality of first acquirer dependent processing components include a plurality of data field objects that are respectively used to process data that is stored in a financial entry that is stored in an acquirer settlement file.

8. A system including:
a plurality of acquirer return metadata files that includes a first acquirer return metadata file that corresponds to a first acquirer that is used to access a financial clearing house system;
a first acquirer return file that is received from the first acquirer and includes a plurality of financial return entries that are respectively associated with a plurality of financial entries that were processed in the financial clearing house system;
a database that stores financial transaction information that is used to generate the plurality of financial entries; and
a return file loader tool that includes a plurality of acquirer independent software components and a plurality of first acquirer dependent software components, the plurality of first acquirer dependent software components being based on the first acquirer return metadata file, the plurality of acquirer independent software components utilizing the first plurality of acquirer dependent software components to update the financial transaction information in the database based on the plurality of financial return entries in the first acquirer return file.

9. The system of claim 8, wherein the plurality of first acquirer dependent software component includes a first data field object to format data that is stored in a first financial transaction record in the database.

10. The system of claim 8, wherein the plurality of acquirer settlement metadata files are respectively utilized by the return file loader tool to respectively process a plurality of acquirer return files that are respectively received from a plurality of different acquirers.

11. The system of claim 8, wherein the plurality of first acquirer dependent software components includes a first data field object utilized to process a first financial return entry data field in a first financial return entry stored in the first acquirer return file.

12. The system of claim 8, wherein the return loader tool includes a return file parser object to parse the acquirer return file.

13. The system of claim 8, wherein the acquirer return metadata file includes a financial return entry template that includes a plurality of financial return entry data field names.

14. The system of claim 8, wherein the first acquirer return file includes a first financial return entry that is automatic clearing house (ACH) return entry.

15. A method including:
generating a plurality of first acquirer dependent software components based on a first acquirer settlement metadata file that corresponds to a first acquirer that is used to access a financial clearing house system, the first acquirer settlement metadata file identified from a plurality of acquirer settlement metadata files based on the first acquirer, the generating the plurality of first acquirer dependent software components done in part with at least one processor; and
generating a first acquirer settlement file based on financial transaction information by utilizing a plurality of acquirer independent software components that utilize the plurality of first acquirer dependent software components, the generating the first acquirer settlement file done in part with at least one processor, the first acquirer settlement file to enable the first acquirer to process the financial transaction information in the financial clearing house system.

16. The method of claim 15, wherein the generating the first acquirer settlement file includes utilizing a first acquirer dependent software component included in the plurality of first acquirer dependent software components to format data stored in a financial entry stored in the first acquirer settlement file.

17. The method of claim 15, wherein the plurality of acquirer settlement metadata files are used to respectively generate a plurality of acquirer settlement files that are respectively communicated to a plurality of different acquirers.

18. The method of claim 15, wherein the first acquirer settlement metadata file includes a financial entry template used to generate a financial entry stored in the first acquirer settlement file.

19. The method of claim 18, wherein the financial entry includes an automatic clearing house (ACH) transaction.

20. The method of claim 18, wherein the financial entry template includes a financial entry data field name that is associated with a set of data field attribute definitions selected from the group consisting of a source-sink attribute, a type attribute, a format attribute, a restriction attribute, an encoding attribute, a lookup attribute, a custom attribute and an error attribute.

21. The method of claim 20, wherein the plurality of first acquirer dependent processing components include a plurality of data field objects that are respectively utilized to process data that is stored in a financial entry that is stored in an acquirer settlement file.

22. A method including:
receiving an acquirer return file from a first acquirer that is used to access a financial clearing house system, the acquirer return file including a plurality of financial return entries that are respectively associated with a plurality of financial entries that were processed in the financial clearing house system;
generating, using at least one processor, a plurality of first acquirer dependent software components based on a first acquirer return metadata file that corresponds to the first acquirer, the first acquirer return metadata file identified from a plurality of acquirer return metadata files based on the first acquirer; and generating, using at least one processor, financial transaction information by utilizing a plurality of acquirer independent software components that utilize the plurality of first acquirer dependent software components to process the first acquirer settlement file.

23. The method of claim 22, wherein the generating financial transaction information includes using the plurality of first acquirer dependent software components to format data stored in a first financial transaction record in the database.

24. The method of claim 22, wherein the plurality of acquirer return metadata files are respectively used by the return file loader tool to respectively process a plurality of acquirer return files that are respectively received from a plurality of different acquirers.

25. The method of claim 22, wherein the generating financial transaction information includes encoding data that is parsed from a first financial return entry data field in a first financial return entry.

26. The method of claim 22, wherein the generating the financial transaction information includes parsing the acquirer return file based on the first acquirer return metadata file.

27. The method of claim 22, wherein the first acquirer return file includes a first financial return entry that is an automatic clearing house (ACH) return entry.

28. A non-transitory tangible machine readable medium storing a set of instructions that, when executed by a machine, cause the machine to:
   generate a plurality of first acquirer dependent software components based on a first acquirer settlement metadata file that corresponds to a first acquirer that is used to access a financial clearing house system, the first acquirer settlement metadata file identified from a plurality of acquirer settlement metadata files based on the first acquirer; and
   generate a first acquirer settlement file based on financial transaction information, the generation to utilize a plurality of acquirer independent software components that utilize the plurality of first acquirer dependent software components, the first acquirer settlement file to enable the first acquirer to process the financial transaction information in the financial clearing house system.

29. A non-transitory tangible machine readable medium storing a set of instructions that, when executed by a machine, cause the machine to:
   receive an acquirer return file from a first acquirer that is used to access a financial clearing house system, the acquirer return file to store a plurality of financial return entries that are respectively associated with a plurality of financial entries that were processed in the financial clearing house system;
   generate a plurality of first acquirer dependent software components based on a first acquirer return metadata file that corresponds to the first acquirer, the first acquirer return metadata file identified from a plurality of acquirer return metadata files based on the first acquirer; and
   generate financial transaction information by utilizing a plurality of acquirer independent software components that utilize the plurality of first acquirer dependent software components to process the first acquirer settlement file.

30. A system including:
   at least one processor for executing:
      a first means for receiving an acquirer return file from a first acquirer that is used to access a financial clearing house system, the acquirer return file storing a plurality of financial return entries that are respectively associated with a plurality of financial entries that were processed in the financial clearing house system;
      a second means for generating a plurality of first acquirer dependent software components based on a first acquirer return metadata file that corresponds to the first acquirer, the first acquirer return metadata file identified from a plurality of acquirer return metadata files based on the first acquirer; and
      a third means for generating financial transaction information by utilizing a plurality of acquirer independent software components that utilize the plurality of first acquirer dependent software components to process the first acquirer settlement file.

* * * * *